United States Patent
Michelsen et al.

(10) Patent No.: US 7,711,638 B2
(45) Date of Patent: May 4, 2010

(54) SYSTEM AND METHOD FOR TRANSFERRING MONEY

(75) Inventors: Michael J. Michelsen, Arvada, CO (US); Deborah Rex, Parker, CO (US); Tom Sayor, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 1126 days.

(21) Appl. No.: 10/803,871

(22) Filed: Mar. 17, 2004

(65) Prior Publication Data

US 2005/0209958 A1 Sep. 22, 2005

(51) Int. Cl.
*G06Q 40/00* (2006.01)
(52) U.S. Cl. ............................................. 705/39
(58) Field of Classification Search ............ 705/35, 705/39–44, 68–70, 73–79; 235/379; 707/1, 707/10, 100–104; 902/8–22
See application file for complete search history.

(56) References Cited

U.S. PATENT DOCUMENTS

| | | | |
|---|---|---|---|
| 5,650,604 A | | 7/1997 | Marcous et al. |
| 5,937,396 A | | 8/1999 | Konya |
| 5,963,647 A | * | 10/1999 | Downing et al. ............. 705/39 |
| 5,987,439 A | * | 11/1999 | Gustin et al. ................ 235/379 |
| 6,149,055 A | * | 11/2000 | Gatto ........................ 235/379 |
| 6,488,203 B1 | * | 12/2002 | Stoutenburg et al. ........ 235/379 |
| 7,120,608 B1 | * | 10/2006 | Gallagher et al. ............. 705/68 |
| 2001/0032182 A1 | | 10/2001 | Kumar et al. |
| 2002/0016769 A1 | * | 2/2002 | Barbara et al. ................ 705/40 |
| 2002/0104878 A1 | * | 8/2002 | Seifert et al. ................ 235/379 |
| 2003/0028491 A1 | * | 2/2003 | Cooper ........................ 705/64 |
| 2003/0036956 A1 | * | 2/2003 | Karas et al. .................... 705/14 |
| 2003/0074310 A1 | * | 4/2003 | Grovit et al. .................. 705/39 |
| 2003/0110049 A1 | * | 6/2003 | Boys ............................. 705/1 |
| 2003/0191711 A1 | | 10/2003 | Jamison et al. |
| 2004/0002917 A1 | * | 1/2004 | Horn et al. .................... 705/39 |
| 2004/0164145 A1 | * | 8/2004 | Licciardello et al. ........ 235/381 |

OTHER PUBLICATIONS

Account And service Fee Schedule, Sep. 8, 2003, http://web.archive.org/web/20030908020054/http://www.ghcu.org/site/fees.htiml.*
State Farm Bank, Accounts, Jun. 30, 2001, http://web.archive.org/web/20010602212128/www.statefarm.com/bank/accounts.htm.*
NetBank, Low Fees: We Share the Cost Savings of being on the Internet with you, Jan. 28, 2001, http://web.archive.org/web/20010128113700/http://netbank.com/terms_fees.htm.*
Messmer, "Feds, States Advance with Benefits Distribution Nets", Mar. 1992, Network World, v9n13, pp. 1, 42.*

* cited by examiner

*Primary Examiner*—Mary Cheung
(74) *Attorney, Agent, or Firm*—Townsend and Townsend and Crew LLP

(57) ABSTRACT

A system and method for facilitating money transfer from a primary account holder to one or more partner accounts. The primary account holder uses a self-service terminal, which displays information on each of several related partner accounts. The displayed partner account information permits the selection of the partner account into which money is to be transferred.

35 Claims, 3 Drawing Sheets

SYSTEM AND METHOD FOR TRANSFERRING MONEY

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The process of "wiring money" has been used for many years as a means to transfer money from a person at one location to a second person at a different location. The process is not always convenient since, among other things, the sender and the recipient typically need to visit a money transfer office either to send or to receive the money. More recently, people wanting to transfer money have been able to use an ATM (automated teller machine) or other self-service terminal to conduct money transfer transactions.

The process of transferring money, even if done at an ATM, can be time-consuming and complicated, as well as inconvenient. For example, the sender will need to know the account of the recipient if it is an inter-account transfer, or may need to know detailed destination information if the money is to be retrieved at a location other than one with a self-service terminal. Further, if an ATM is to be used by both the sender and the recipient, the sender may need to get a PIN (personal identification number), as well as security/payout codes and other information, from the initiating ATM, and separately communicate that information to the recipient, in order for money to be retrieved by the recipient at a dispensing ATM or location.

BRIEF SUMMARY OF THE INVENTION

Embodiments of the invention-provide systems and method and for transferring money from a sender to a recipient. One or more predetermined recipients are associated with a sender.

In some embodiments, the sender uses an initiating terminal, where in response to the sender entering sender account information, recipient account information for one or more predetermined or selected recipients are provided at the initiating terminal in order for the sender to designate the recipient to whom money is to be transferred.

In further embodiments, a database stores account information for senders and recipients, wherein account information (primary account information) for a specific sender is stored and related to account information (partner account information) for recipients associated with that sender. The database is connected by a network to terminals, and when primary account information is entered at an initiating terminal in the network, such information is transmitted to the database, and partner account information for the associated recipients is returned to the initiating terminal.

A more complete understanding of the present invention may be derived by referring to the detailed description of the invention and to the claims, when considered in connection with the Figures.

DETAILED DESCRIPTION OF THE INVENTION

Figure 1:
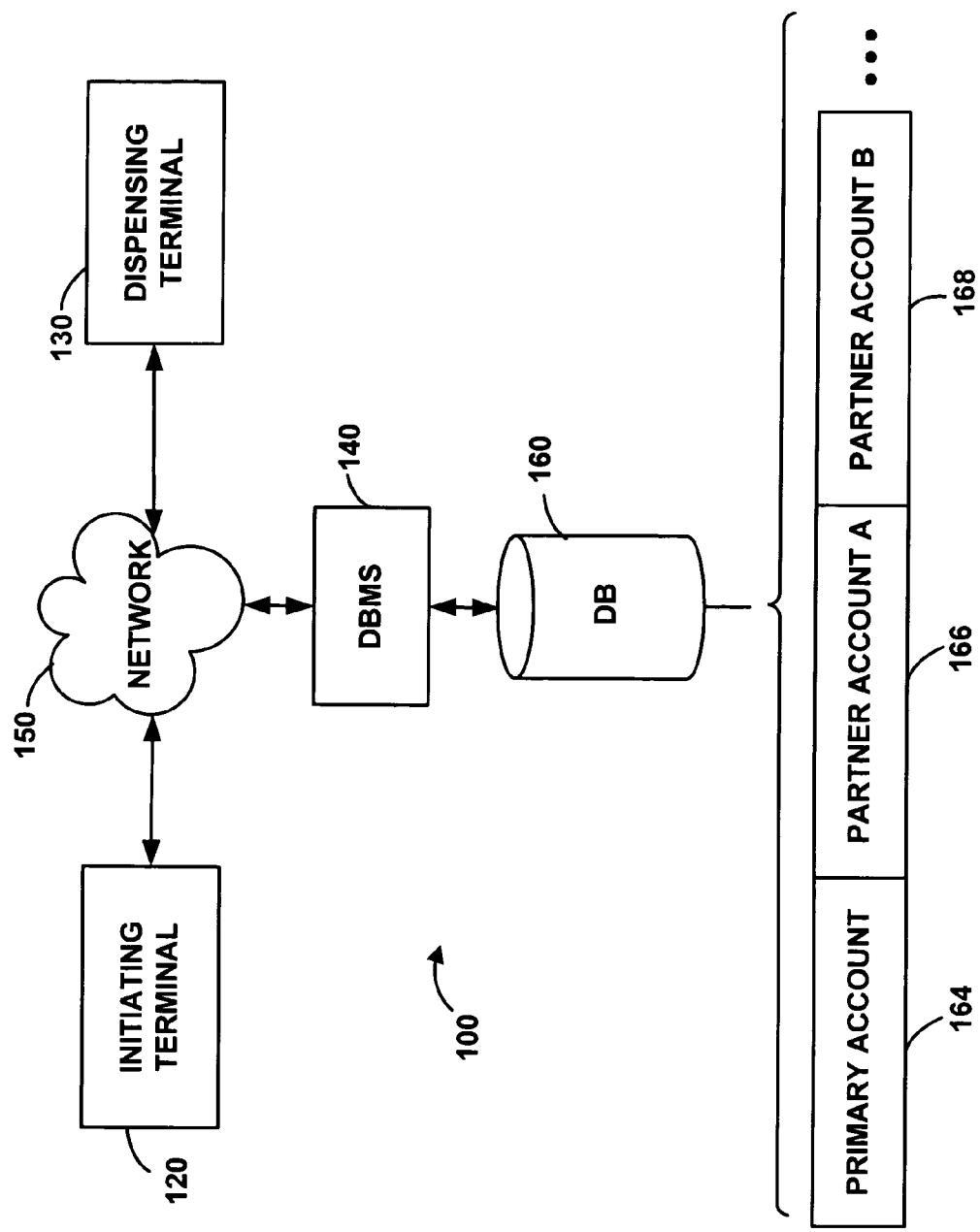
FIG. 1 is a schematic diagram of one embodiment of a system for transferring money.

There are various embodiments and configurations for implementing the present invention. One such implementation is shown in FIG. 1, where according to an embodiment of the invention, a system 100 for transferring money (and performing other transactions) is illustrated. The system 100 includes an initiating terminal 120, a dispensing terminal 130, and a database management system (DBMS) 140, all connected and communicating with each other via a network 150.

The system and network as thus far described are well known and existing, such as might be found in an ATM network operated by a bank or other financial institution, where the terminals 120,130 are each an ATM for conducting various financial transactions for customers of the financial institution, and where the DBMS 140 may be a central database system for maintaining the accounts of customers. The network 150 may be a dedicated network maintained by the financial institution operating the DBMS 140. Alternatively, network 150 may be part of or linked to a public network (including the public switched telephone network (PSTN) or the Internet), or may be part of or linked to a plurality of networks, so that ATMs other than those operated by a single financial institution may be used to conduct transactions and access the DBS 140.

It should be appreciated that while only two terminals 120,130 are illustrated in the Figures, the ATM network interconnected by network 150 would likely comprise a large number of such terminals or ATMs. Further, although self-service terminal 120 is denominated as an "initiating terminal" and self-service terminal 130 is denominated as a "dispensing terminal", either of those terminals (and others in the network) could be used to both initiate transactions and dispense cash (or other forms of payment).

As seen in FIG. 1, the DBMS 140 is connected to a data store or database 160, which stores account information for customers using the system 100. In the illustrated embodiment, it is anticipated that, among other things, customers may have debit card accounts, and may use the terminals 120, 130 for conducting various transactions such as withdrawals, deposits and transferring money between accounts. Such transactions are managed using the data stored in the database 160.

The DBMS 140 may be a relational database management system that permits data in the database 160 to be created, maintained, manipulated and retrieved. The database 160 is likewise relational and, as conventional, stores data in tables, with the DBMS 140 using, for example, a structured query language (SQL) in order to maintain and operate the database. While the DBMS 140 and database 160 are relational in the illustrated embodiment, those skilled in the art will appreciate that there are many types of databases (e.g., sequential flat files, hierarchical, object oriented, etc.) that could be used within the scope of the present invention.

FIG. 1 illustrates (in simplified form) a database table 162 for maintaining the account of one customer or account holder. Database table 162 may contain various data fields pertaining to the account holder. In the illustrated embodiment, the account holder or customer (using a debit card to conduct transactions at one of the terminals 120,130) is referred to as the primary account holder. One or more data fields (designated collectively as "primary account" field 164) have information associated with that primary account holder. Such field or fields of data may include the primary account holder's account number, name, PIN (for authorizing transactions), social security number, address, individual transaction data (e.g., for deposits, withdrawals, transfers, and purchases) and account balance.

In addition to the primary account field 164, database table also includes data and data fields for each of several related partner accounts. Only two partner accounts and corresponding fields (166, 168) are shown in FIG. 1 (Partner Account A and Partner Account B), but as will be more fully understood later, there could be any number (one or more) of such related partner accounts (and corresponding fields) in the database 160.

While all the data pertaining to the primary and partner accounts is illustrated as stored in database 160, it should be appreciated that the data could be stored in several different databases linked to each other by the network 150. In such case, the primary and partner accounts could be related through a common data parameter or data link, such as the primary account number.

In one embodiment of the invention, relating each primary account to one or more partner accounts (within database 160) facilitates the transfer of money between those accounts. For example, as will be more fully described below in conjunction with FIGS. 2 and 3, if the primary account holder (sender or originator) wants to transfer money from the primary account to one of the account holders of the related partner accounts (recipients or beneficiaries), such a transaction may be initiated by the primary account holder at the initiating terminal 120, and the DBMS 140 provides (when accessing the primary account information) information on each related partner account. The primary account holder may transfer money without having to know or remember the details (e.g., account numbers) of the partner accounts, including the one to which money is to be transferred. Once the transfer to the partner account has been completed, the partner account holder (recipient of the money transfer) may go to any terminal in the network (e.g., the dispensing terminal 130), and use his/her debit card to access the partner account and withdraw all or some part of the transferred money.

It should be noted that the establishment of partner accounts can be done either when the primary account is set up, or later in time. For example, the user holding the primary account may establish the primary account with the purpose in mind of using the account to periodically transfer money to another person. For example, the user may have a family member at a distant location, such as a child in college, and it is anticipated that money will need to be periodically provided in a form that can be conveniently accessed, such as at an ATM near the recipient, using a debit card. In such a case, as part of setting up the primary account, the user provides necessary account information (e.g., name, address, social security number) for himself as well as information needed to set up each partner account. In one embodiment, such information could be provided in person at a financial institution, for example to a bank employee. The debit card issued for the partner accounts could be given to the primary account holder (to send himself to the partner account holders) or could be sent directly by the bank.

Alternatively, the user may establish partner accounts after the primary account has already been established and in use. For example, the user may have previously established a debit account for conducting various transactions (e.g., making deposits, withdrawing cash, paying for merchandise at retail establishments, etc.), but later decides to add partner accounts in order to make money transfers. If the primary account is already in place, the partner accounts could be established in person (at a bank branch office, money transfer office, etc.) or could be established without having to visit a financial institution, e.g., by using one of the self-service terminals or accessing the bank's website to enter account information required for setting up the partner accounts.

It should be appreciated that the information needed for partner accounts could be less or otherwise different than that needed for a primary account. For example, the primary account holder may or may not have full information (address, social security number, etc.) for each recipient, but could establish the partner account and have the recipient provide necessary information later, e.g., as a condition to withdrawing cash. Also, a recipient could be properly identified and authorized to make withdrawals without a PIN or debit card being established for the recipient by the primary account holder, for example, by matching personal information supplied by the recipient (including biometric information) at the dispensing terminal to already existing and verifiable data in governmental (e.g., driver license) or other databases.

Further, if an anticipated recipient already has an account in the bank's network, a user could designate that existing account as a partner account (e.g., by identifying the existing account to the bank when setting up the arrangement), and could thereafter transfer money into that account. As should be appreciated, any account holder could be either a sender or a recipient, and thus in some cases an account holder might be a sender (in relation to one third party account) and in other cases a recipient (in relation to a different third party account).

Figure 2:
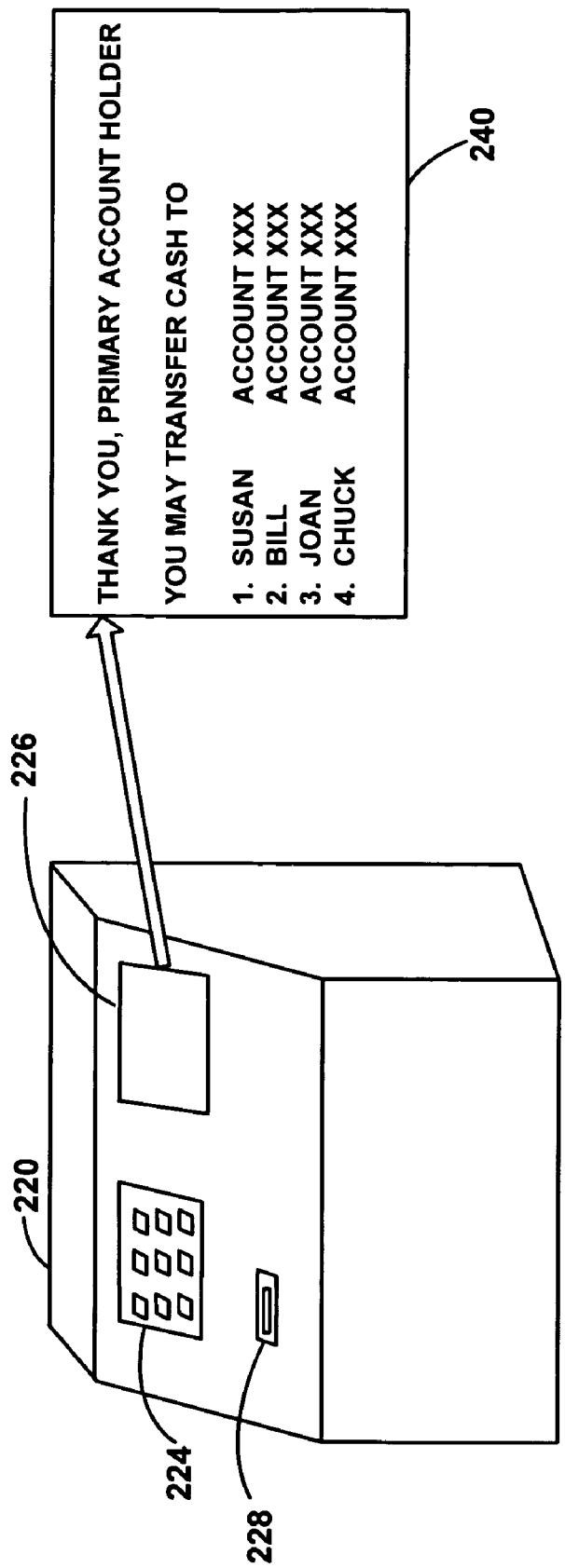
FIG. 2 illustrates an ATM and ATM screen display that could be used in the system of FIG. 1.
Figure 3:
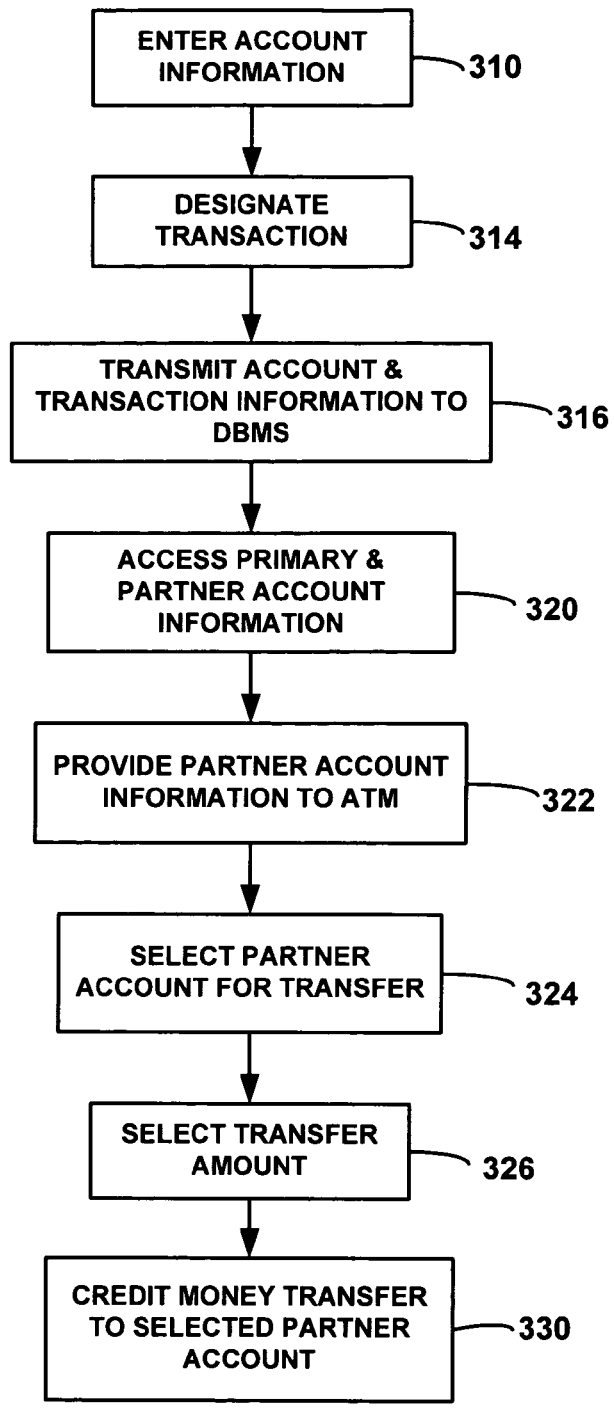
FIG. 3 is a flow diagram illustrating a money transfer transaction using the system of FIG. 1.

In FIG. 2 there is shown an ATM 220 that in one embodiment could provide the function of the initiating terminal 120 (FIG. 1). FIG. 3 illustrates a method for using the ATM 220 in conjunction with the system 100 for making money transfers, and thus the description that follows makes simultaneous reference to FIGS. 1, 2 and 3.

The ATM 220 has a keyboard 224, a display screen 226 and a card reader 228. When the user (primary account holder) wishes to make a money transfer to a partner account holder, the user inserts a debit card into the card reader 228 in order to input primary account information at the ATM (step 310). The operation of the ATM may require that the user also enter a PIN at the keyboard 224 in order to validate the user's access to the primary account (not illustrated). The ATM will ask the user to designate a transaction at step 314 (such as by selecting transaction options displayed on the screen 226), which in the described embodiment is assumed to be a money transfer transaction (other transactions could, of course, be selected by the user if desired). The primary account information and transaction selection is provided by the ATM 220 to the DBMS 140 over network 150 (step 316).

The DBMS 140 then accesses (step 320) primary and related partner account information at database 160 in response to the data from the ATM 220. At step 322, such partner account information is returned to the ATM 220 and displayed at screen 226. An example of the display of partner account information is illustrated at the screen display 240 seen in FIG. 2, and may include helpful information to assist the user in selecting the partner account into which money is to be transferred. As illustrated in FIG. 2, the display at the ATM 220 may include the names and account numbers for each of the related partner accounts that have been set up by the user.

While not shown in the Figures, it should be appreciated that other helpful information could be displayed at the ATM 220 in order to identify recipients, such as a recipient address, telephone number or code name. Also, the balance in each partner account could be displayed in order to help the primary account holder determine how much to transfer. Further, recent transactions for each partner account could be displayed so that spending or withdrawal levels by the partner account holder could be seen. Also, the primary account holder or user may have his own balance displayed, so the available moneys to transfer from the primary account can be determined by the user.

After viewing the partner account information, the user may select (e.g., by using the keyboard 224) the account into which money is to be transferred (step 324) and the amount to be transferred (step 326). Such entered information is sent to the DBMS 140, and an appropriate journal entry is made and reflected in the primary and partner accounts maintained at the database 160 (the primary account is debited by the transferred amount and partner account is credited), step 330.

While not illustrated in FIG. 3, the partner account holder may then take his/her debit card to dispensing terminal 130 (e.g., an ATM similar to ATM 220), insert his card, and use the terminal to withdraw some or all of the money that has been transferred from the primary account.

It should be appreciated that alternative methods and systems could be used to transfer money from the primary account to one of the partner accounts. For example, rather than self-service terminals, the initiating terminal 120 and/or dispensing terminal 130 could be agent operated terminals located at a money transfer office. When a user wants to transfer money, the user visits the money transfer office, and provides primary account information to the money transfer agent (e.g., by swiping a debit card at a card reader near the agent or by providing an account number to the agent). In a manner similar to that described in connection with ATM 220, the partner account information could be accessed and returned to the agent terminal for display and selection by either the agent or the user. In some cases, it may be sufficient for the user (sender) to provide only his/her name to an agent, and the primary account is merely a name (sender's name) to which various recipients (and their partner accounts and/or destination instructions) are linked by DBMS 140.

Likewise, the partner account holder (recipient) could use a money transfer office to receive the money transfer (rather than an ATM). For example, the partner account may have a given pick-up location (transfer office) always designated for that account (the database 160 has such information stored with the account), and the transferred money is automatically sent or wired to that office for the recipient to stop and pick up.

Similarly, the dispensing terminal could be used by the recipient to receive value (from the partner account) in forms other than cash (e.g., coupons, money orders, stored value cards, etc.)

In other embodiments, money transfers may be conducted over the Internet without having to go an ATM, e.g., by the primary account holder using a personal computer to access his primary account (over the Internet). The user may use his personal computer keyboard to enter primary account information, and thereby retrieve primary and partner account information from database 160. The account information is displayed so that the user may select (using the keyboard) the partner account into which money is to be transferred.

The system could also be designed to permit automatic transfers from the primary account to a selected partner account, so that if periodic transfers of a predetermined amount are desired, such transfers could be established in advance when the recipient is selected by the primary account holder.

In one embodiment, to help manage cash transfer transactions, the user could also establish multiple groups of partner accounts. For example, if the user wants to transfer a certain amount of money to two different groups of recipients (say $500 to children's accounts and $500 to grandchildren's accounts), the ATM display 226 could be programmed to display those two groups separately at the ATM 220. The user could first view one group and select how much of the $500 is to be transferred (from the primary account) to each of the partner accounts in the first group (e.g., children), based on the balance in each child's account, and then view and select how much of the $500 is to be transferred to each of the partner accounts in the second group (e.g., grandchildren), based on the balance in each grandchild's account.

While the embodiments in the Figures illustrate the primary and partner accounts being used for purposes of transferring money between accounts, it should be appreciated that once an account has a balance, it may be used for other purposes as well. Since in the previously described embodiments each account is accessed using a debit card, either the primary account holder or the partner account holder may use the debit card to make purchases at retail establishments, like any conventional debit card or credit card. The purchase amounts would be debited from the account balance. Also, either the primary or partner account holder may make deposits to his/her own account in order to replenish the account, as well as make transfers to other accounts (e.g., a recipient may "repay" a sender by subsequently transferring money from a partner account to a primary account). Typically, but not always, it is the primary account into which deposits are made and from which transfers are thereafter made to partner accounts. The financial institution managing the accounts may impose fees for such transactions (deposits, money transfers, withdrawals, purchases, etc.), with the convenience fee for a money transfer typically being higher (akin to the customary fee for making a traditional money wire or money transfer) than fees imposed for making deposits or conducting other transactions. The fee for a money transfer could be charged either when the actual transfer takes place, or could be charged when dispensed to the recipient (e.g., a fee which might be based on the amount dispensed, say $1 for every $100 that is dispensed or that is used for purchases by the recipient).

In some embodiments, a sender might choose to establish a finding pool for a group of recipients to whom a total sum of money is transferred (either periodically, or at times chosen by the sender). While in some cases the recipients might each have a separate partner account (among which the total sum could be divided), in other cases multiple recipients could have access to a single partner account, and any one of the recipients could withdraw some or all of the transferred amount from the shared account. Each recipient in the finding pool could choose to receive cash at a dispensing terminal, use his/her debit card to make purchases debited against the shared partner account, transfer money from the shared account to a separate account of the recipient, or receive a money order at a location (money transfer office) established in connection with the partner account.

Further, in other embodiments the primary and/or partner accounts may be other forms of stored value accounts, such as gift card accounts. For example, a retail establishment may encourage a customers to establish partner gift card accounts for relatives and friends, whereby a customer may periodically visit a self service terminal or see a customer service agent, and replenish the amounts in the gift card accounts. In such, instances, the customer may see (from the self-service terminal or from a customer representative display or printout) information on each partner account in order to decide whether to put additional funds in those gift card accounts. The gift cards may include means for conducting electronic transductions in order to redeem the gift card (e.g., magnetic stripe on the gift card for use at a card reader at a store). Alternatively, the gift card could display account information on its face which may be used by a store clerk to identify to account when the card is presented for redemption.

While detailed descriptions of presently preferred embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for transferring money between a sender and a recipient, comprising:
   an initiating terminal for initiating the transfer of money by a sender;
   a dispensing terminal where transferred money may be received by a recipient; and
   a database configured for storing account information of senders and recipients, and configured for relating account information of a sender to account information of one or more associated recipients so that, in response to a subsequent request at the initiating terminal from the sender, account information for the associated recipients, including at least a portion of an account number, is automatically provided to the initiating terminal, wherein the system is configured to facilitate the transfer of money from the sender to one or more of the associated recipients by the selection of the account information, including at least a portion of the account number, corresponding to the recipient.

2. The system of claim 1, wherein the account number provided to the initiating terminal comprises one or more alphanumeric characters.

3. The system of claim 1, wherein the account information relates to an account maintained at a financial institution and indentified at the financial institution by an account identifier associated with the account, and wherein the account number provided to the initiating terminal comprises at least a portion of the account identifier used by the financial institution to identify the account of the associated recipients.

4. The system of claim 1, wherein the account information for the associated recipients further includes a balance of money in an account associated with the account number, so that an amount of the money transferred to one or more of the associated recipients may be selected based on the balance.

5. The system of claim 1, wherein the account information for the associated recipients further includes transactions conducted against an account associated with the account number, so that an amount of the money transferred to one or more of the associated recipients may be selected based on the transactions.

6. A system for transferring money from an originator to a beneficiary, comprising:
   a network of terminals, including an initiating terminal for initiating a money transfer and a dispensing terminal for dispensing transferred money, wherein at least the initiating terminal has a display device for displaying information;
   a database in communication with the initiating and dispensing terminals, and configured for storing account information relating to an account of an originator and account information relating to accounts of beneficiaries, and configured for relating account information of the originator to account information of one or more predetermined beneficiaries; and
   a database management system configured for managing the originator and beneficiary accounts, and subsequent to the relating of account information of the originator and beneficiaries at the database and in response to a request at the initiating terminal to transfer money from the originator, configured for automatically accessing the database for account information of the predetermined beneficiaries, so that account information, including at least a portion of an account number and a balance in the account associated with the account number, for each predetermined beneficiary is provided to the initiating terminal for display at the display device, wherein the system is configured to facilitate the transfer of money from the originator to one of the predetermined beneficiaries by selecting, among the displayed beneficiary account information, including at least a portion of the account number and the balance, corresponding to the one or more beneficiaries to receive transferred money.

7. A system for crediting funds from consumer to consumer, comprising:
   terminal means for initiating the transfer of money, including a display means;
   data base means configured for storing account information of senders and recipients, and configured for relating account information of an account of a sender to account information of an account of one or more selected recipients; and
   database management means in communication with the terminal means, and configured for managing sender and recipient accounts, and subsequent to the relating of account information of the sender and recipients at the database means and in response to a request at the terminal means to transfer money from the sender, configured for automatically accessing account information including at least a portion of account numbers and balances in the accounts associated with each of the account numbers for the selected recipients at the database means, so that account information including at least a portion of the account numbers for the selected recipients are provided to the terminal means for display at the display means, wherein the system is configured to facilitate the transfer of money from the sender to one or more of the selected recipients by the selection of the account information, including at least a portion of the account numbers and the balances, corresponding to the selected recipients.

8. A method for displaying data at a terminal in connection with transferring money from the debit account of a sender to a recipient, the method comprising:
   associating a debit account of the sender with a debit account of one or more recipients, the associated recipients being those to whom the sender may transfer money; and subsequent to associating a debit account of the sender with a debit account of the recipients, and after entry of sender account information at the terminal, automatically displaying information on each of the associated recipients, so that the recipient to receive the money transfer may be selected based on the displayed information;

wherein the debit account information of the sender is associated with debit account information of the associated recipients, and wherein the displayed information on each of the associated recipients is the account information, including at least a portion of an account number and an account balance, of those recipients.

9. The method of claim 8, wherein the recipient account information displayed farther includes the name of the recipient.

10. The method of claim 8, wherein the money transfer is made from the account of the sender to an account of the selected recipient.

11. The method of claim 8, wherein the money transfer is made from the account of the sender and is wired to a destination associated with the recipient.

12. A method for transferring money from a sender at an initiating terminal to a recipient at a dispensing terminal, comprising:

establishing an account and account information for each sender and each recipient;

for a specific sender, establishing in advance one or more recipients to whom money may be transferred by the specific sender;

subsequent to establishing an account and account information and to establishing one or more recipients, and in response to entering account information for the specific sender at an initiating terminal, automatically providing account information for the established recipients for display at the initiating terminal, in order for the sender to designate one or more recipients to whom money may be transferred, the account information including at least a portion of an account number and transactions conducted against the account for the recipients; and transferring money to the account of the recipient designated by the sender by the selection of the account information, including at least a portion of the account number, corresponding to the designated recipient, without the sender being required to communicate payout information to the recipient and without the sender needing to know details of the recipient account information prior to designation of the recipient, so that the recipient may receive the transferred money at a dispensing terminal.

13. The method of claim 12, further comprising:

storing the account information for each sender and each recipient in a database connected to the initiating terminal, wherein the account information of the specific sender is related to the account information of the established recipients within the database;

wherein the step of providing account information for the established recipients at the initiating terminal comprises:

retrieving the stored account information of the established recipients from the database; and providing the retrieved account information to the initiating terminal.

14. The method of claim 12, wherein the initiating terminal is a self-service terminal.

15. The method of claim 14, wherein the self-service terminal is an ATM.

16. The method of claim 12, wherein the initiating terminal is an agent operated terminal.

17. The method of claim 12, wherein the accounts established for the sender and the recipient are debit accounts.

18. The method of claim 17, wherein the initiating terminal is a self-service terminal and wherein the sender account information is entered at the self-service terminal by providing a debit account card to a card reader at the self-service terminal.

19. The method of claim 12, wherein the dispensing terminal is a self-service terminal.

20. The method of claim 19, wherein the self-service terminal is an ATM.

21. The method of claim 12, wherein the dispensing terminal is a self-service terminal and wherein the transferred money is dispensed at the self-service terminal in response to providing a debit account card to a card reader at the self-service terminal.

22. The method of claim 12, wherein the dispensing terminal is an agent operated terminal.

23. The method of claim 12, wherein the account established for each recipient is a gift card account, and wherein the method further comprises:

providing a gift card to each recipient that is used to conduct transactions against the gift card account.

24. A method for transferring money from a sender at an initiating terminal to a recipient at a dispensing terminal, comprising:

predetermining one or more recipients to whom money may be transferred, and establishing an account for each of the predetermined recipients, and relating each of the recipient accounts to an account of the sender;

storing account information for each of the predetermined recipients;

subsequently requesting the transfer of money at the initiating terminal;

automatically accessing the stored account information for each of the predetermined recipients and providing that account information for display at the initiating terminal so that the sender can select one or more recipients to whom money is to be transferred, the provided account information including at least a portion of an account number and transactions conducted against one or more of the recipient accounts;

transferring money to the selected recipients by posting a credit from the account of the sender to the account of the selected recipients, in response to the selection of the account information, including at least a portion of the account number, corresponding to the selected recipients; and retrieving the transferred money from the account of the selected recipients at one or more of the dispensing terminals, without the sender being required to communicate payout information to the recipient and without the sender needing to know details of the recipient account information prior to its selection.

25. A method for conducting transactions at a financial terminal, wherein the transactions include transferring money from senders at initiating terminals to recipients at dispensing terminals, the method comprising:

establishing an account for each sender and an account for each recipient;

storing account information for each sender and recipient;

for a specific sender, establishing recipients to whom money may be transferred by the specific sender;

subsequently requesting transfer of money by the specific sender at an initiating terminal;

automatically providing account information for each of the established recipients for display at the initiating terminal, so that the sender can select the established recipient to whom money may be transferred, the provided account information including at least a portion of an account number and transactions conducted against the account associated with the account number; and transferring money from the account of the sender to the account of the recipient selected by the sender by the selection of the account information, including at least a portion of the account number corresponding to the recipient, without the sender being required to communicate payout information to the recipient and without the sender needing to know details of the recipient account information prior to its selection, so that the recipient may receive the transferred money at a dispensing terminal.

26. The method of claim 25, wherein the transactions farther include depositing money in the account of the sender, wherein a fee is charged for conducting at least some transactions, and wherein the fee charged for transferring money is higher than the fee charged for depositing money.

27. The method of claim 25, wherein account information for a recipient includes destination information for wiring money to that recipient, and wherein the step of transferring money comprises electronically transmitting the transferred money to a location specified by the destination information.

28. A system for transferring money from one consumer as a sender to a second, different consumer as a recipient, the system comprising:

an initiating terminal configured for initiating the transfer of money, including displaying information pertaining to the transfer of money; and a database configured for storing account information of senders and recipients, and configured for relating account information of a sender to account information of one or more associated recipients so that, in response to a subsequent request at the initiating terminal from the sender, account information, including at least a portion of an account number for the associated recipients and transactions against an account associated with the account number, is automatically provided to and displayed for selection by the sender at the initiating terminal, wherein the system is configured to transfer money from the sender to one or more of the associated recipients in response to selection of the recipient account information, including at least a portion of the account number, without the sender being required to communicate payout information to the recipient and without the sender needing to know details of the recipient account information prior to its selection.

29. The system of claim 28, farther comprising:

a database management system in communication with the initiating terminal, for managing sender and recipient accounts at the database;

wherein at least some of the sender and related recipient accounts are debit accounts, and wherein the transfer of money is made by transferring money from an account of the sender to an account of the recipients.

30. The system of claim 29 wherein the database management system is in communication with the initiating terminal and the dispensing terminal.

31. The system of claim 30, wherein at least one of the initiating and dispensing terminals is a self-service terminal.

32. The system of claim 31, wherein the self-service terminal is an ATM.

33. The system of claim 30, wherein at least one of the initiating and dispensing terminals is a terminal operated by a money transfer agent.

34. The system of claim 30, wherein the initiating and dispensing terminals are the same terminal.

35. The system of claim 30, wherein the initialing and dispensing terminals are different terminals.

* * * * *

UNITED STATES PATENT AND TRADEMARK OFFICE
CERTIFICATE OF CORRECTION

PATENT NO. : 7,711,638 B2  Page 1 of 1
APPLICATION NO. : 10/803871
DATED : May 4, 2010
INVENTOR(S) : Michael J. Michelsen et al.

It is certified that error appears in the above-identified patent and that said Letters Patent is hereby corrected as shown below:

Column 6, line 54, delete "finding" and insert --funding--

Column 6, line 61, delete "finding" and insert --funding--

Column 9, claim 9, line 15, delete "farther" and insert --further--

Column 11, claim 26, lines 18-19, delete "farther" and insert --further--

Column 12, claim 29, line 14, delete "farther" and insert --further--

Signed and Sealed this

Twentieth Day of July, 2010

David J. Kappos
*Director of the United States Patent and Trademark Office*